US010613682B2

(12) United States Patent
Stevenson (10) Patent No.: US 10,613,682 B2
(45) Date of Patent: Apr. 7, 2020

(54) DYNAMIC SELF-CAPACITIVE MEASUREMENT ACQUISITION

(71) Applicant: Synaptics Incorporated, San Jose, CA (US)

(72) Inventor: Matthew Stevenson, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 187 days.

(21) Appl. No.: 15/664,971

(22) Filed: Jul. 31, 2017

(65) Prior Publication Data

US 2019/0034028 A1  Jan. 31, 2019

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
None
See application file for complete search history.

(56) References Cited

U.S. PATENT DOCUMENTS

| 2013/0194229 A1* | 8/2013 | Sabo ........................ G06F 3/044 345/174 |
| 2014/0204058 A1* | 7/2014 | Huang ..................... G06F 3/044 345/174 |
| 2016/0154507 A1* | 6/2016 | Bharathan ............... G06F 3/011 345/174 |

* cited by examiner

Primary Examiner — Benjamin C Lee
Assistant Examiner — Krishna P Neupane
(74) Attorney, Agent, or Firm — Ferguson Braswell Fraser Kubasta PC (57) ABSTRACT

Sensor circuitry is configured to perform, for a sensing frame, mutual capacitive sensing to obtain mutual capacitive measurements, and perform, for the sensing frame, first self-capacitive sensing to obtain first self-capacitive measurements, and perform second self-capacitive sensing to obtain a second self-capacitive measurements. Processing circuitry is connected to the sensor circuitry and is configured to detect an inconsistency between the mutual capacitive measurements and the first self-capacitive measurements, and halt, in response to detecting the inconsistency, a second sensing frame to trigger performing the second self-capacitive sensing. The second sensing frame is subsequent to the first sensing frame. The processing circuitry is further configured to determine intermittent interference using the first self-capacitive measurements and the second self-capacitive measurements.

17 Claims, 4 Drawing Sheets

DYNAMIC SELF-CAPACITIVE MEASUREMENT ACQUISITION

FIELD

This invention generally relates to electronic devices, and, more specifically, to proximity sensor devices.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (e.g., opaque touchpads integrated in, or peripheral to, notebook or desktop computers). Proximity sensor devices are also often used in smaller computing systems (e.g., touch screens integrated in cellular phones).

Proximity sensor devices are subject to interference from a variety of external sources. Interference is the presence of noise in the sensing region that impedes the detection of input objects. For example, interference may be due to the display, through input objects at other locations, and other conductive sources. Interference may be persistent or intermittent. The presence of interference impacts the input device's ability to accurately detect and determine positional information for input objects. Thus, interference is managed. The technique to manage interference is dependent on whether the interference is persistent or intermittent.

SUMMARY

Dynamic self-capacitive measurement acquisition is disclosed for interference management. Sensor circuitry is configured to perform, for a sensing frame, mutual capacitive sensing to obtain mutual capacitive measurements, and perform, for the sensing frame, first self-capacitive sensing to obtain first self-capacitive measurements, and perform second self-capacitive sensing to obtain a second self-capacitive measurements. Processing circuitry is coupled to the sensor circuitry and is configured to detect an inconsistency between the mutual capacitive measurements and the first self-capacitive measurements, and halt, in response to detecting the inconsistency, a second sensing frame to trigger performing the second self-capacitive sensing. The second sensing frame is subsequent to the first sensing frame. The processing circuitry is further configured to determine intermittent interference using the first self-capacitive measurements and the second self-capacitive measurements.

A method for dynamic self-capacitive measurement acquisition is disclosed for interference management. The method includes performing, for a sensing frame, mutual capacitive sensing to obtain mutual capacitive measurements, and performing, for the sensing frame, first self-capacitive sensing to obtain first self-capacitive measurements. The method further includes detecting an inconsistency between the mutual capacitive measurements and the first self-capacitive measurements, and halting, in response to detecting the inconsistency, a second sensing frame to trigger performing the second self-capacitive sensing. The second sensing frame is subsequent to the first sensing frame. The method further includes performing second self-capacitive sensing to obtain a second self-capacitive measurements, and determine intermittent interference using the first self-capacitive measurements and the second self-capacitive measurements.

An input device for dynamic self-capacitive measurement acquisition is disclosed for interference management. The input device includes sensor electrodes configured to acquire a measurements of a sensing region using a plurality of sensor electrodes and a processing system. The processing system is configured to perform, for a sensing frame, mutual capacitive sensing to obtain mutual capacitive measurements, and perform, for the sensing frame, first self-capacitive sensing to obtain first self-capacitive measurements. The processing system is further configured to detect an inconsistency between the mutual capacitive measurements and the first self-capacitive measurements, and halt, in response to detecting the inconsistency, a second sensing frame to trigger performing the second self-capacitive sensing. The second sensing frame is subsequent to the first sensing frame. The processing system is further configured to perform second self-capacitive sensing to obtain a second self-capacitive measurements, and determine intermittent interference using the first self-capacitive measurements and the second self-capacitive measurements.

Other aspects of the technology will be apparent from the following description and the appended claims.

BRIEF DESCRIPTION OF DRAWINGS

Exemplary embodiments of the present technology will hereinafter be described in conjunction with the appended drawings, where like designations denote like elements.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input devices and methods that facilitate improved usability. In particular, one or more embodiments are directed to interference management in accordance with one or more embodiments of the disclosure. Interference is an undesirable electrical disturbance that may cause incorrect detection of input objects in a sensing region of a capacitive input device. Interference impedes the detection of input objects. Interference may be in the form of persistent interference or intermittent interference. Persistent interference is interference that lasts over a period of time whereas intermittent interference occurs at irregular or sporadic intervals that is discontinuous. One or more embodiments provide a technique for differentiating between persistent interference and intermittent interference in self-capacitive sensing, and may further correct the interference based on the type of interference.

In one or more embodiments, a sensing frame is obtained. The sensing frame includes obtaining self-capacitive measurements and mutual capacitive measurements. The sensing frame is processed while another sensing frame is obtained, and if the self-capacitive measurements do not match the mutual capacitive measurements, then the subsequent sensing frame is halted and new self-capacitive measurements are obtained. The sets of self-capacitive measurements are compared to determine whether the interference is persistent or intermittent, and the corresponding correction applied.

Figure 1:
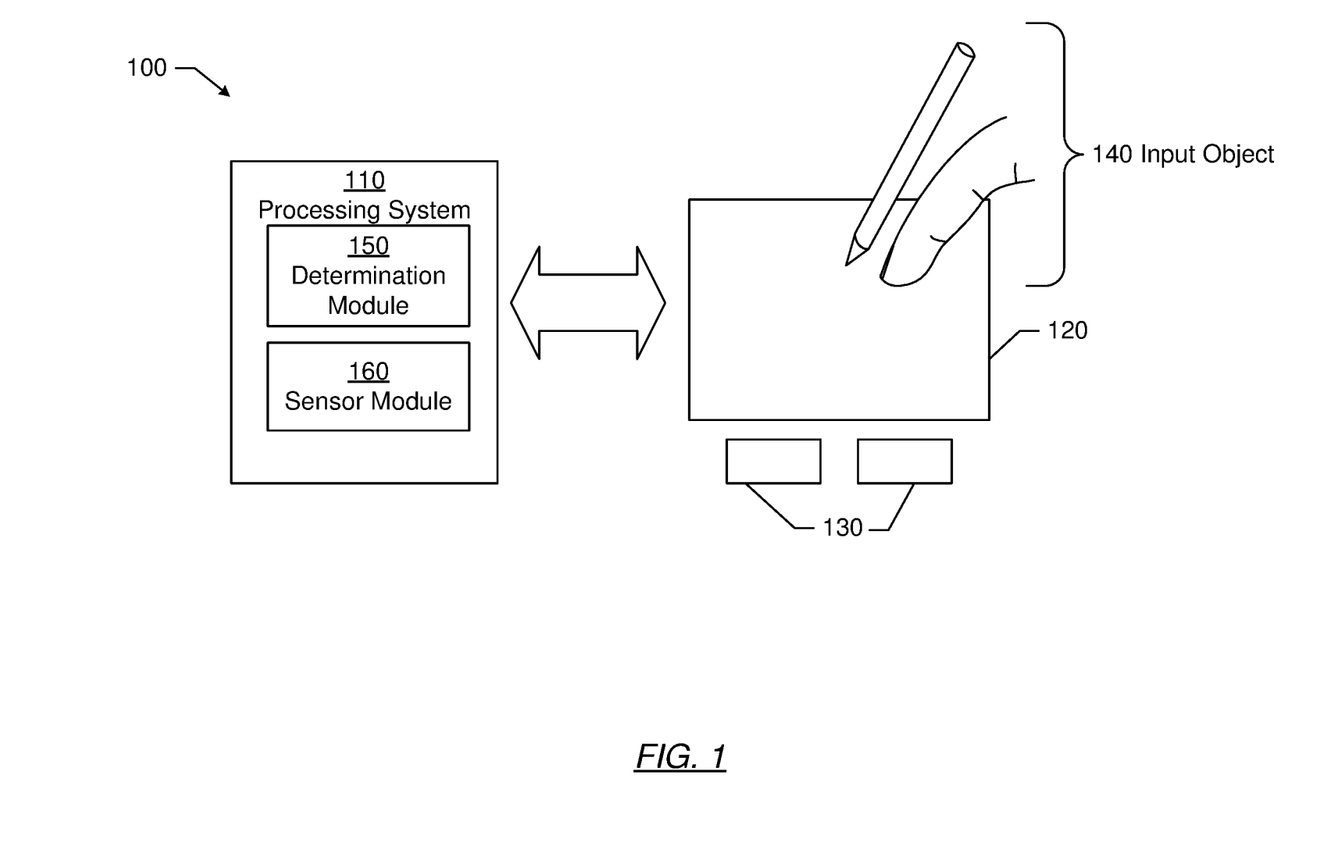
FIG. 1 is a block diagram of an example system that includes an input device in accordance with an embodiment of the disclosure.

Turning now to the figures, FIG. 1 shows a block diagram of an exemplary input device (100), in accordance with embodiments of the disclosure. The input device (100) may be configured to provide input to an electronic system (not shown for simplicity). As used in this document, the term "electronic system" (or "electronic device") broadly refers to any system capable of electronically processing information. Examples of electronic systems may include personal computers of all sizes and shapes (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the electronic system. In the alternative, the input device (100) may be physically separate from the electronic system. The input device (100) may be coupled to (and communicate with) components of the electronic system using various wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (such as a "touchpad" or a "touch sensor device") configured to sense input provided by one or more input objects (140) in a sensing region (120). Example input objects include fingers and styli. The sensing region (120) may encompass any space above, around, in and/or near the input device (100) in which the input device (100) is able to detect user input (e.g., provided by one or more input objects (140)). Theسizes, shapes, and locations of particular sensing regions may vary depending on actual implementations.

In some embodiments, the sensing region (120) extends from a surface of the input device (100) in one or more directions into space, for example, until a signal-to-noise ratio falls below a threshold suitable for object detection. For example, the distance to which this sensing region (120) extends in a particular direction, in various embodiments, may be on the order of less than a millimeter, millimeters, centimeters, or more, and may vary with the type of sensing technology used and/or the accuracy desired. In some embodiments, the sensing region (120) detects inputs involving no physical contact with any surfaces of the input device (100), contact with an input surface (e.g. a touch surface) of the input device (100), contact with an input surface of the input device (100) coupled with some amount of applied force or pressure, and/or a combination thereof.

In various embodiments, input surfaces may be provided by surfaces of a housing of the input device (100) within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, optical, and/or other suitable techniques.

Some implementations are configured to provide images that span one, two, three, or higher-dimensional spaces. An image is a collection of measurements of the sensing region where each measurement corresponds to a particular position on the sensing region. For example, in capacitive implementation, a capacitive image has a capacitive measurement for each location of the sensing region. Some implementations are configured to use and/or provide projections of input along particular axes or planes. A projection is an aggregation of measurements along the axis or plane. For example, a projection may have multiple values, where each value is along a first axis, and each value is a sum of the measurements along a second axis. By way of a more specific example, a column projection may have a single value for each row of a column, where each single value corresponds to a sum of the measurement values for the row. Further, some implementations may be configured to use and/or provide a combination of one or more images and one or more projections.

The input device (100) may utilize various sensing technologies to detect user input. Example sending technologies may include resistive, inductive, capacitive, elastive, magnetic, acoustic, ultrasonic, and optical sensing technologies. In some embodiments, the input device (100) may include one or more sensing elements configured to implement the various sensing technologies.

In some embodiments, the input device (100) may implement resistive sensing technologies to detect user input. For example, the sensing region (120) may be formed by a flexible and conductive first layer separated by one or more spacer elements from a conductive second layer. The sensing region (120) may detect user input by creating one or more voltage gradients across the layers and sensing when the first layer is brought in contact with the second layer. More specifically, pressing the flexible first layer may deflect it sufficiently to create electrical contact between the layers, resulting in voltage outputs reflective of the point(s) of contact between the layers. These voltage outputs may be used to determine positional information of the detected inputs.

In other embodiments, the input device (100) may utilize inductive sensing technologies to detect user inputs. For example, the sensing region (120) may include one or more sensing elements configured to pick up loop currents induced by a resonating coil or pair of coils. The input device (100) may then detect user input based on a combination of the magnitude, phase, and/or frequency of the currents. The characteristics of the loop currents may further be used to determine positional information about the detected inputs.

In some embodiments, the input device (100) may utilize capacitive sensing technologies to detect user input. For example, the sensing region (120) may input one or more capacitive sensing elements (e.g., sensor electrodes) to create an electric field. The input device (100) may detect inputs based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self-capacitance" (also referred to as "absolute capacitance") and/or mutual capacitance (Also referred to as "transcapacitance"). Absolute capacitance sensing methods detect changes in the capacitive coupling between sensor electrodes and an input object. Absolute capacitance sensing measures the self-capacitance of the sensor electrode, where the self-capacitance is the amount of electric charge that must be added to a sensor electrode to raise the sensor electrode's electric potential by one unit (e.g., one volt). The self-capacitance of the sensor electrode changes when an input object is proximate to the sensor electrode. For example, an input object near the sensor electrodes may alter the electric field near the sensor electrodes, thus changing the measured capacitive coupling. In some embodiments, the input device (100) may implement by modulating sensor electrodes with respect to a reference voltage (e.g., system ground), and detecting the capacitive coupling between the sensor electrodes and input objects. The reference voltage may be a substantially constant voltage, a varying voltage, or corresponds to a system ground. Measurements acquired using absolute capacitance sensing methods may be referred to as absolute capacitive measurements.

Transcapacitance sending methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). Signals on the transmitter sensor electrodes may be modulated relative to a reference voltage (e.g., system ground) to transmit transmitter signals while receiver sensor electrodes may be held at a substantially constant voltage relative to the reference voltage to receive resulting signals. The reference voltage may be a substantially constant voltage or may be system ground. The resulting signal may be affected by environmental interference (e.g., other electromagnetic signals) as well as input objects in contact with, or in close proximity to, the sensor electrodes. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

The processing system (110) may be configured to operate the hardware of the input device (100) to detect input in the sensing region (120). The processing system (110) may include parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may be implemented in hardware, firmware, software, or a combination thereof. In some embodiments, the processing system (110) may include processing circuitry (150) configured to determine when at least one input object is in a sensing region, determine signal to noise ratio, determine positional information of an input object, identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. The processing circuitry (150) and the sensor circuitry (160) may be coupled. In some embodiments, the sensor circuitry (160) may include sensory circuitry that is coupled to the sensing elements. The sensory circuitry may include, for example, a transmitter module including transmitter circuitry that is coupled to a transmitting portion of the sensing elements and a receiver module including receiver circuitry coupled to a receiving portion of the sensing elements.

Although FIG. 1 shows only processing circuitry (150) and sensor circuitry (160), alternative or additional modules may exist in accordance with one or more embodiments of the disclosure. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. A baseline is an estimate of the raw measurements of the sensing region when an input object is not present. For example, a capacitive baseline is an estimate of the background capacitance of the sensing region. Each sensing element may have a corresponding individual value in the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While many embodiments are described in the context of a fully-functioning apparatus, the mechanisms of are capable of being distributed as a program product (e.g., software) in a variety of forms. For example, the mechanisms of the disclosure may be implemented and distributed as a software program on information-bearing media that are readable by electronic processors (e.g., non-transitory computer-readable and/or recordable/writable information bearing media that is readable by the processing system (110)). Additionally, the embodiments apply equally regardless of the particular type of medium used to carry out the distribution. For example, software instructions in the form of computer readable program code to perform embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion of the disclosure may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosure. For example, various components may be combined to create a single component. As another example, the functionality performed by a single component may be performed by two or more components.

Figure 2:
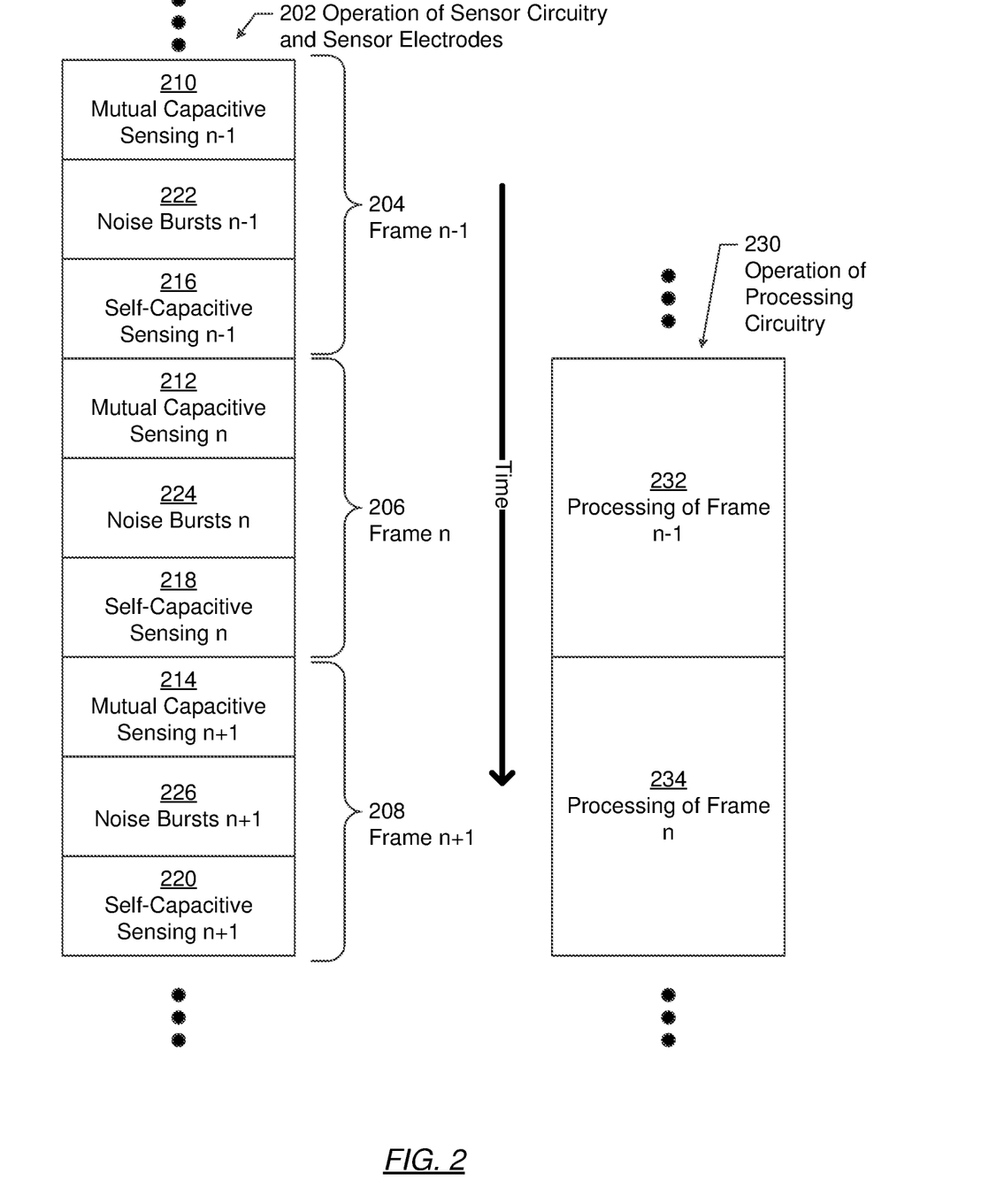
FIG. 2 shows a schematic diagram of operating sensor circuitry and processing circuitry in accordance with one or more embodiments of the disclosure.

FIG. 2 shows a schematic diagram of operating sensor circuitry and processing circuitry in accordance with one or more embodiments. As discussed above, the sensor circuitry is configured to acquire measurements from the sensing region by driving sensor electrodes or modulating sensor electrodes with respect to a reference voltage. The value of the measurements may be affected by the presence of any input objects in the sensing region and/or interference, such as noise, in the sensing region. The processing circuitry may process the measurements and determine positional information of the input objects in the sensing region.

The left side of FIG. 2 illustrates the operation of the sensor circuitry and the sensor electrodes (202). More specifically, sensor circuitry of the input device captures the sensing region on a per frame (e.g., frame n−1 (204), frame n (206), frame n+1 (208)) basis. Each frame (e.g., frame n−1 (204), frame n (206), frame n+1 (208)) represents a time window during which a single capture of the status of the sensing region is performed. The status of the sensing region may be, for example, with respect to the presence of any input object. The time window of the frame is of a size that may be perceived as instantaneous to a human operator such that an input object may be approximated as being stationary, or as being in a single position, in a frame. The three collinear dots represent additional frames that may be captured and/or processed before or after the frames shown in FIG. 2.

In one or more embodiments, after processing a frame, a report may be generated and communicated to other components of the processing system, input device, host system, or another device, or any combination thereof. Each report may include positional information regarding any input objects in the sensing region during the frame, change in locations of input objects as compared to one or more prior frames, relative position of an input object, and so on.

During a single frame, mutual capacitive sensing (e.g., mutual capacitive sensing n−1 (210), mutual capacitive sensing n (212), mutual capacitive sensing n+1 (214)), self-capacitive sensing (e.g., self-capacitive sensing n−1 (216), self-capacitive sensing n (218), self-capacitive sensing n+1 (220)), and, optionally, noise bursts (e.g., noise bursts n−1 (222), noise bursts n (224), noise bursts n+1 (226)) may be performed. During mutual capacitive sensing, the sensor circuitry drives the transmitter sensor electrodes with transmitter signals and receives resulting signals with receiver transmitter electrodes. The resulting signals (or mutual capacitance) correspond to the capacitance between the transmitter electrodes and the receiver electrodes as affected by the presence of any input object and interference near intersection of respective transmitter electrode and receiver electrode. A mutual capacitive image of the sensing region may be generated using a mutual capacitive measurement at each intersection of transmitter electrodes and receiver electrodes.

Self-capacitance of the sensor electrodes may be determined by self-capacitive sensing during which the sensor circuitry modulates sensing signals on the sensor electrodes with respect to a reference voltage. Based on the modulation, the sensor circuitry can detect self-capacitive measurements of each sensor electrode. The self-capacitance may be affected by the presence of input objects in the sensing region and interference. In one or more embodiments, self-capacitive sensing may create a self-capacitive image or self-capacitive profiles of the sensing region. For example, if the sensor electrodes are an advanced matrix pad (AMP) sensor, then a separate sensor electrode may exist for each location in a sensor grid on the sensing region. In such a scenario, the self-capacitive image has a self-capacitive measurement for each location of the grid. By way of another example, a single separate sensor electrode may exist for each row and each column of the sensing region. In such a scenario, each row may have a single self-capacitive measurement in a first profile and each column may have a single self-capacitive measurement value in a second profile. Although the above is discussed with respect to a grid pattern of sensor electrodes, other sensor electrode patterns may be used. For example, irregular patterns and non-grid configurations may be used.

Noise bursts may be used for noise measurement. During noise bursts, the receiver electrodes receive resulting signals while suspending transmission at the transmitter electrodes. Thus, only receiver electrodes receive without the transmitter electrodes transmitting. When noise bursts are performed, interference affecting mutual capacitive measurements may be present without showing the presence of input objects. Noise bursts may be performed, for example, to select a frequency for transmission.

Although FIG. 2 shows a frame having an order of mutual capacitive sensing, followed by noise bursts, followed by self-capacitive sensing, the order may be different.

The right side of FIG. 2 shows operations of the processing circuitry (230) in accordance with one or more embodiments. As shown, the processing circuitry processes each frame (e.g., processing of frame n−1 (232), processing of frame n (234)) in order. Processing each frame includes processing the mutual capacitive measurements, the self-capacitive measurements and the noise bursts. Processing the mutual capacitive measurements may include subtracting a current mutual capacitive baseline from the raw mutual capacitive measurements acquired by the sensor circuitry to obtain delta mutual capacitive measurements.

The mutual capacitive baseline may be an estimation of the background capacitance of the sensor electrodes when an input object is not present. For example, the mutual capacitive baseline may be an estimation of persistent noise in the sensing region that affects the mutual capacitive measurements. Each measurement value may have a corresponding baseline value in the baseline. The corresponding baseline value may be subtracted from the raw measurement value to obtain the delta measurement value. When the mutual capacitive baseline is incorrect, an input object that is present in the sensing region may not be detected by the processing circuitry because the corresponding resulting delta mutual capacitive measurements may not satisfy a detection threshold. Similarly, an input object that is not actually present in the sensing region may be detected by the processing circuitry because the corresponding resulting delta mutual capacitive measurements may falsely satisfy the detection threshold.

Processing of the mutual capacitive measurements may include other spatial and/or temporal filters, generating projections, identifying clusters of mutual capacitive measurements satisfying a detection threshold and other processing.

Processing the self-capacitive measurements may include subtracting a current self-capacitive baseline from the raw self-capacitive measurements acquired by the sensor circuitry to obtain delta self-capacitive measurements. Similar to mutual capacitive baseline, the self-capacitive baseline may be an estimation of the background capacitance of the sensor electrodes when an input object is not present. For example, the self-capacitive baseline is an estimation of persistent noise in the sensing region that affects the self-capacitive measurements. Each measurement value may have a corresponding baseline value in the baseline. The corresponding baseline value may be subtracted from the raw measurement value to obtain the delta measurement value. When the self-capacitive baseline is incorrect, an input object that is present in the sensing region may not be detected by the processing circuitry because the corresponding resulting delta self-capacitive measurements may not satisfy a detection threshold. Similarly, an input object that is not actually present in the sensing region may be detected by the processing circuitry because the corresponding resulting delta self-capacitive measurements may falsely satisfy the detection threshold. Processing of the self-capacitive measurements may include other spatial and/or temporal filters, identifying peak values satisfying a detection threshold and other processing.

Processing a frame may further include comparing the mutual capacitive measurements with the absolute capacitive measurements as described below and in FIG. 3. The combination of mutual capacitive measurements and absolute capacitive measurements may be used for moisture touch detection, baseline error detection, low ground mass correction, and other corrections. Moisture touch detection is to detect the presence of one or more input objects when moisture (e.g., water or other liquid) is on the sensing region surface and affecting the resulting measurement values. Baseline error correction is to correct when an absolute or mutual capacitive baseline results in falsely detecting input objects or failed to detect input objects. Low ground mass correction is to detect that the input device is in a low ground mass state causing the resulting signals and the corresponding measurements to be unstable, and then applying a correction to each of the measurements to detect an input object.

Further, noise bursts may be processed by using the measurements from the noise bursts as an estimation of the noise and adjusting the baselines or frequencies used for sensing accordingly.

Although FIG. 2 shows processing a frame after the sensor circuitry completes the frame, the processing may be partially concurrent with generation of the frame by the sensor circuitry. For example, once the sensor circuitry acquires the mutual capacitive measurements, the processing circuitry may begin processing the mutual capacitive measurements. As such, the start of processing of the measurements may be performed as soon as the inputs (e.g., corresponding measurements) to the type of processing are received.

When a frame is processed by the processing circuitry, a determination may be made whether the mutual capacitive measurements and the self-capacitive measurements are consistent (e.g., both indicate a presence of input object or lack thereof). If inconsistent, then the processing circuitry is configured to halt the sensor circuitry from obtaining the next frame and trigger the sensor circuitry to obtain absolute capacitive measurements. For example, if the sensor circuitry is in the process of obtaining mutual capacitive measurements or noise burst measurements, the sensor circuitry immediately stops obtaining the mutual capacitive measurements or noise bursts and acquires the absolute capacitive measurements. The sensor circuitry then provides the newly acquired absolute capacitive measurements to the processing circuitry, which performs the processing described in FIG. 3.

Figure 3:
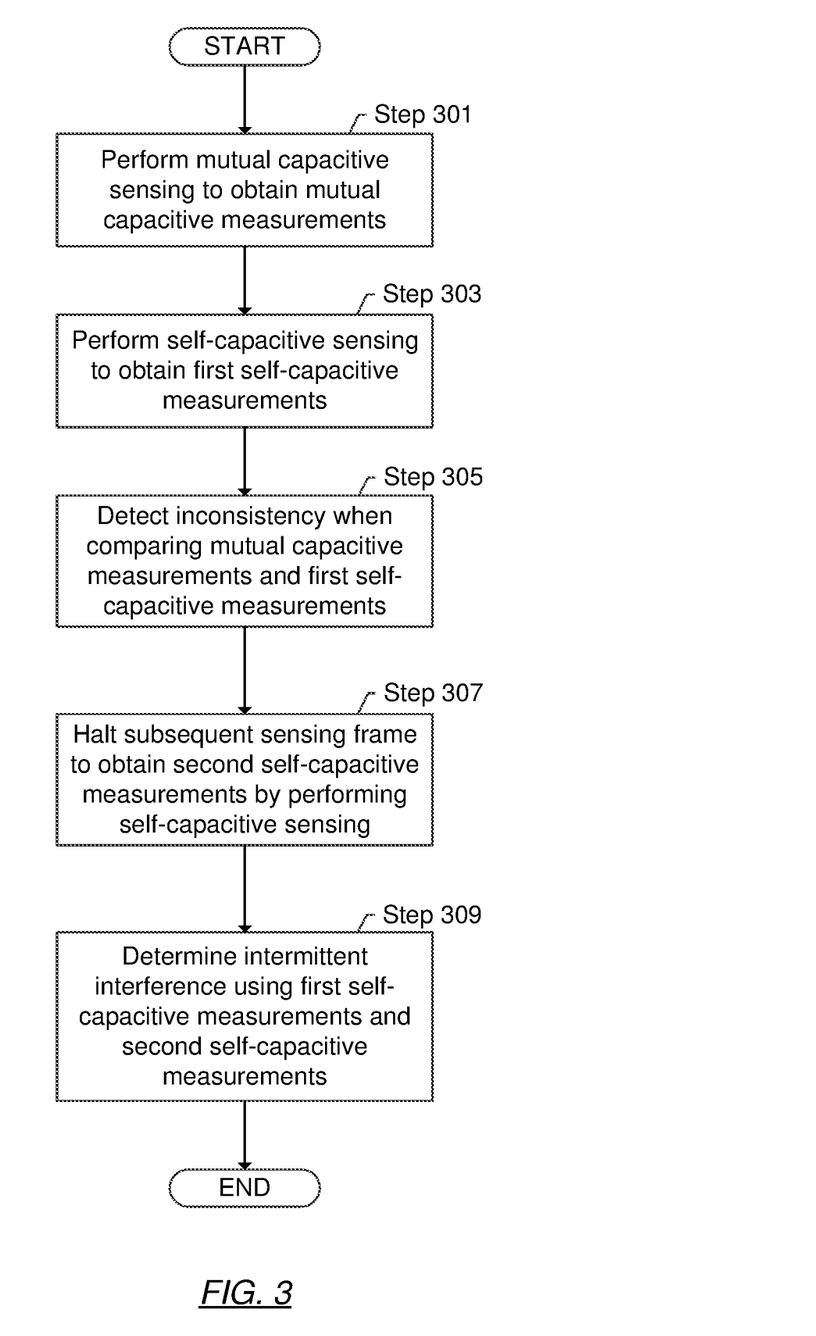
FIG. 3 shows a flowchart for interference management in accordance with one or more embodiments.

FIG. 3 shows a flowchart for interference management in accordance with one or more embodiments. While the various steps in this flowchart are presented and described sequentially, some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

In Step 301, mutual capacitive sensing is performed to obtain mutual capacitive measurements using the sensor circuitry and sensor electrodes as described above with reference to FIG. 2.

In Step 303, self-capacitive measurements sensing is performed to obtain first self-capacitive measurements of the sensing region using the sensor circuitry and the sensor electrodes as described above with reference to FIG. 2. The self-capacitive sensing in Step 303 and the mutual capacitive sensing in Step 301 are performed during the same frame of sensing. From the self-capacitive sensing, self-capacitive measurements are acquired. For the purposes of distinction from later acquired self-capacitive measurements, the self-capacitive measurements obtained in Step 303 are referred to as first self-capacitive measurements.

In Step 305, an inconsistency is detected when comparing the mutual capacitive measurements with the first self-capacitive measurements in accordance with one or more embodiments of the disclosure. For example, the mutual capacitive measurements and the first self-capacitive measurements may be individually processed, such as to account for a corresponding baseline and to perform spatial and/or temporal filtering as described above with reference to FIG. 2. For the purposes of simplifying the description, the same terminology of mutual capacitive measurements and self-capacitive measurements is used to refer to the measurements before and after any preprocessing (e.g., to account for the baseline). Unless explicitly specified using words, "raw" and "delta", the corresponding measurements may be at any stage of preprocessing.

Further, the mutual capacitive measurements and absolute capacitive measurements may be compared with corresponding detection thresholds. In some embodiments, because self-capacitive sensing detects input objects at a greater distance from the sensor electrode than mutual capacitive sensing, an artificially higher detection threshold than the normal detection threshold may be set for the self-capacitive measurements in order to disqualify hovering objects and for the purposes of the consistency check. Further, other techniques may be used to account for the greater sensitivity of the self-capacitive sensing to input objects.

Locations of the input objects in the corresponding capacitive measurements may be determined from the measurements that satisfy the detection thresholds. Various techniques may be used to determine the locations from the measurements satisfying the detection thresholds, such as based on locations of peaks in the measurements, number of adjacent measurements satisfying the detection threshold, etc.

The comparison of the mutual capacitive measurements and first self-capacitive measurements is performed to determine whether any input objects detected in the mutual capacitive measurements correspond to any input objects detected in the first self-capacitive measurements. Multiple techniques may be used to perform the comparison between sets of measurements (i.e., set of mutual capacitive measurements and set of self-capacitive measurements). Some of the techniques are described below.

In some embodiments, direct comparison can be made between a self-capacitive image derived from self-capacitive measurements and a mutual capacitive image derived from mutual capacitive measurements. For example, for each identified location of an input object, the location of the input object in the sensing region determined from the mutual capacitive measurements is compared with location of the input objects determined from the self-capacitive measurements. If the locations match or are within a threshold distance to each other, then the self-capacitive measurements and the mutual capacitive measurements are deemed consistent. More specifically, consistency is determined by both sets of measurements indicating the same or substantially the same locations of input objects. If an input object in an image does not match a location of an input object in the other image, then the mutual capacitive measurements and the self-capacitive measurements may be deemed inconsistent.

In some embodiments, comparison may be made using self-capacitive profiles. More specifically, the locations of the input objects in the self-capacitive profiles are projected on the sensing region. In the projection, a single self-capacitive measurement is attributed to the entire length of the sensor electrode from which the measurement is obtained. Thus, a location of a possible input object is any location along the length of the sensor electrode in the sensing region. For row/column sensor electrodes, a location in the self-capacitive profile identifies an entire row or column of the sensing region in which the input object may be located. The intersection of the identified rows and columns between the self-capacitive profiles identify the possible locations in the sensing region in which the input object may be located.

Continuing with the comparison using the self-capacitive profiles, the comparison of the self-capacitive measurements and the mutual capacitive measurements may be performed by determining whether each location of an input object in the mutual capacitive measurements is at an intersection of the projections. If an input object is not located at an intersection, then the self-capacitive measurements and mutual capacitive measurements may be determined to be inconsistent. The comparison may further include determining whether each projected location of an input object from the self-capacitive measurements has at least one location of an input object from the mutual capacitive measurements. If a projected location of an input object from the self-capacitive measurements does not have at least one location of an input object from the mutual capacitive measurements, then the self-capacitive measurements and the mutual capacitive measurements are inconsistent. If each location of an input object in the mutual capacitive measurements is at an intersection of the projections and a projected location of an input object from the self-capacitive measurements has at least one location of an input object from the mutual capacitive measurements, then the measurements may be deemed consistent.

In some embodiments, comparison may be made by projecting locations of the input object detected in the mutual capacitive image on the self-capacitive profiles. In the projection, a location of an input object is attributed to both of the sensor electrodes that form the capacitor used to identify the location. Thus, a location in the mutual capacitive image identifies a separate location in each self-capacitive profile. Comparison of the self-capacitive measurements and the mutual capacitive measurements may be performed by determining whether each location of an input object in the projection is a location of the input object in the self-capacitive profile and whether each location in the self-capacitive profile is in the projection. If a location is not in both the projection and the self-capacitive profile, then the self-capacitive measurements and the mutual capacitive measurements are inconsistent. If all locations are in both the projection and the self-capacitive profile, then the self-capacitive measurements and the mutual capacitive measurements are consistent.

The above are only a few examples of determining whether self-capacitive measurements and mutual capacitive measurements are consistent. Other techniques for determining the consistency and inconsistency between the self-capacitive measurements and mutual capacitive measurements may be used without departing from the scope of the disclosure.

In the example shown in FIG. 3, an inconsistency is detected between the self-capacitive measurements and mutual capacitive measurements in Step 305. Accordingly, in Step 307, a subsequent sensing frame is halted in response to detecting the inconsistency in order to obtain second self-capacitive measurements of the sensing region by performing self-capacitive sensing. The processing system triggers the sensor circuitry to stop the current frame being performed by the sensor circuitry and to collect absolute capacitive measurements. The trigger may be in the form of a predefined signal from the processing circuitry to the sensor circuitry.

In Step 309, intermittent interference is determined using the first self-capacitive measurements and the second self-capacitive measurements in accordance. The first self-capacitive measurements and the second self-capacitive measurements are compared. In some embodiments, the comparison may be performed by determining whether the same location(s) of input object(s) are in the first self-capacitive measurements and the second self-capacitive measurements. Same locations are locations that are within a threshold distance to each other.

In some embodiments, the comparison may be performed by determining whether the geometric shape of the first self-capacitive measurement and the second self-capacitive measurements are within a threshold to each other. The geometric shape refers to the shape of the measurements if the measurements were plotted on a graph with one axis of the graph being the sensor electrode axis and the other axis of the graph being the value of the measurement axis. The geometric shapes may be compared without plotting the self-capacitive measurements by comparing the slopes between neighboring sensor electrodes. The slope may be determined for a self-capacitive measurement to a neighboring self-capacitive measurement (e.g., a self-capacitive measurement within a pre-defined distance away). If the slopes are consistent between the first self-capacitive measurements and the second self-capacitive measurements, then the self-capacitive measurements are determined to be consistent. If the slopes are not consistent, then the self-capacitive measurements may be deemed inconsistent.

The above are only a few examples of determining whether the first self-capacitive measurements and second self-capacitive measurements are consistent. Other techniques for determining the consistency and inconsistency between the self-capacitive measurements.

If the first self-capacitive measurements and the second self-capacitive measurements are consistent, then persistent interference may be detected. Persistent interference is due to a continued error affecting the self-capacitive measurements. Persistent interference may be managed by updating a baseline. Persistent interference may reflect baseline error, or an error in the baseline, as the baseline does not reflect background noise. Thus, persistent interference may be mitigated by relaxing the baseline as described below in reference to FIG. 4.

However, if the first self-capacitive measurements and the second self-capacitive measurements are inconsistent, then intermittent interference is detected. In such a scenario, adjusting the baseline to account for such interference would cause present input objects to not be detected or non-existent input objects to be detected. Thus, mitigation for intermittent interference may be performed. Techniques to mitigate for intermittent interference may be to change a frequency of self-capacitive sensing, repetitively perform self-capacitive sensing to obtain consistent self-capacitive measurements, or perform other operations to mitigate for the intermittent interference.

Figure 4:
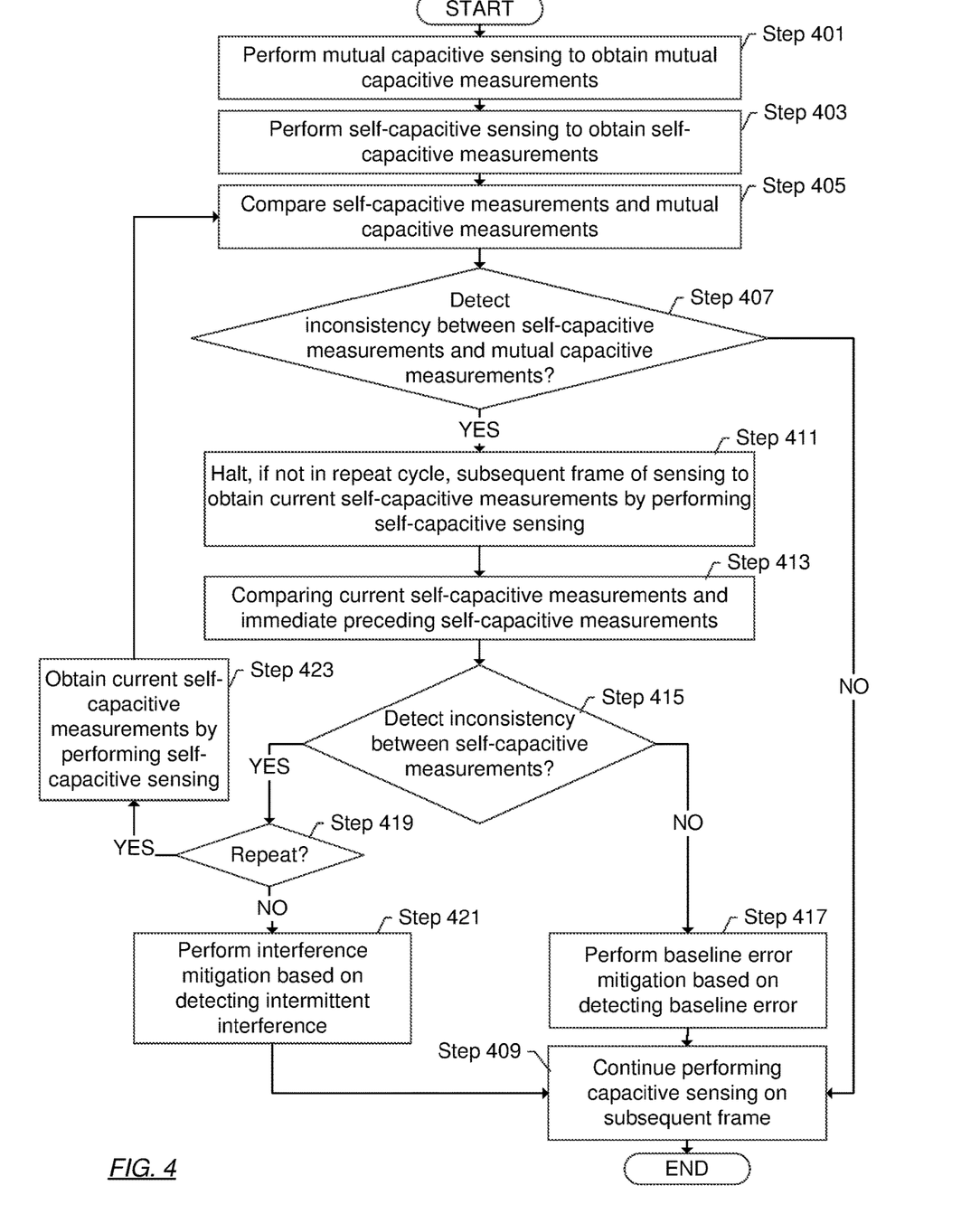
FIG. 4 shows a flowchart in accordance with one or more embodiments of the disclosure.

FIG. 4 show a flowchart in accordance with one or more embodiments of the disclosure. While the various steps in this flowchart are presented and described sequentially, some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

The steps shown in FIG. 4 may be performed in combination with the steps shown in FIG. 3. Further, some of the steps may be omitted. Similarly, only some steps shown in FIG. 4 may be added to FIG. 3.

In Step 401, mutual capacitive sensing is performed to obtain mutual capacitive measurements. In Step 403, self-capacitive sensing is performed to obtain self-capacitive measurements. Mutual capacitive sensing and self-capacitive sensing may be performed as discussed above in reference to FIGS. 2 and 3.

In Step 405, the self-capacitive measurements and the mutual capacitive measurements are compared. The self-capacitive measurements and the mutual capacitive measurements may be compared as discussed above in reference to FIG. 3.

In Step 407, a determination is made whether an inconsistency is detected between the self-capacitive measurements and the mutual capacitive measurements in accordance with one or more embodiments of the disclosure. Detecting an inconsistency may be performed as discussed above in reference to FIG. 3.

If an inconsistency is not detected, then the flow may proceed to Step 409. In Step 409, the system continues to perform capacitive sensing on subsequent frames. In particular, the processing circuitry continues to process the current frame, such as to perform moisture detection and mitigation, low-ground mass detection and mitigation, and other operations, and obtains positional information. The processing circuitry may send the positional information to a host, an application, central processing unit, etc., and the host may perform an action based on the positional information. Similarly, the sensor circuitry may continue to perform frames of sensing. Further, the flow of FIG. 4 may repeat for each frame of sensing.

Returning to Step 407, if an inconsistency is detected between the self-capacitive measurements and the mutual capacitive measurements, if not in a repeat cycle (described below), the subsequent frame of sensing is halted to obtain current self-capacitive measurements by performing self-capacitive sensing. Triggering the halt and obtaining current self-capacitive measurements may be performed as discussed above in reference to FIGS. 2 and 3.

In Step 413, the current self-capacitive measurements are compared with an immediate preceding self-capacitive measurements in accordance with one or more embodiments of the disclosure. The most recently obtained self-capacitive measurements are compared with the immediately preceding obtained self-capacitive measurements to check for consistency in accordance with one or more embodiments of the disclosure. Comparing the self-capacitive measurements may be performed as discussed above with reference to FIG. 3.

In Step 415, a determination is made whether an inconsistency is detected between the self-capacitive measurements compared in Step 413. Detecting an inconsistency is performed as discussed above with reference to FIG. 3. If an inconsistency is not detected, the flow proceeds to Step 417. In particular, the processing system may consider the inconsistency between self-capacitive measurements and mutual capacitive measurements as persistent interference.

In Step 417, in one or more embodiments, baseline error mitigation is performed based on detecting a baseline error. For example, fast relaxation or accelerated relaxation of one or more of the self-capacitive baselines and mutual capacitive baseline may be performed. Relaxation changes the values of the baseline for each current sensing frame by a defined amount to be closer to the measurements of the current sensing frame. Thus, if the measurements in several sensing frames are the exact same, then over a predefined period of time, the baseline values will be the same as the measurements over the sensing frames. However, if the measurement values over the sensing frames change, then the baseline values may adjust to be closer to the measurement values without matching any sensing frame's measurement values. Other baseline error mitigation techniques or persistent interference techniques may alternatively or additionally be performed without departing from the scope of the disclosure.

Returning to Step 415, if an inconsistency is detected between self-capacitive measurements, the flow may proceed to Step 419. In Step 419, a determination is made whether to repeat as part of a repeat cycle. The repeat cycle repetitively obtains self-capacitive measurements until the self-capacitive measurements are consistent with the mutual capacitive measurements or with each other. For example, in a scenario in which repetitive intermittent interference exists, the processing system may continue to obtain self-capacitive measurements until such self-capacitive measurements do not exhibit intermittent interference or until a predefined number of attempts at obtaining such self-capacitive measurements has elapsed. For example, the pre-defined number of attempts may be three.

If a determination is made to repeat, the flow proceeds to Step 423 to start the repeat cycle. In Step 423, current self-capacitive measurements are obtained by performing self-capacitive sensing in accordance with one or more embodiments of the disclosure. In a repeat cycle, the sensor circuitry may be halted from a prior iteration in one or more embodiments and a new trigger to halt the sensor circuitry is not sent. In other embodiments, the sensor circuitry immediately continues operating to obtain the next frame after obtaining the current self-capacitive measurements for the processing circuitry. In such a scenario, the processing circuitry may trigger the sensor circuitry to halt and obtain current self-capacitive measurements in a repeat cycle. The self-capacitive measurements obtained in Step 423 are compared in Step 405 with the mutual capacitive measurements, and if inconsistent, compared in Step 413, with the immediate preceding self-capacitive measurements. Optionally, if the processing system is in a repeat cycle, the comparison in Step 413 may be several sets of self-capacitive measurements obtained for the current frame, in Step 411, and part of the repeat cycle. The repeat cycle may include obtaining self-capacitive measurements in using different frequencies to modulate the sensing signals. Each set of self-capacitive measurements may be obtained using a different sensing frequency than each other set of self-capacitive measurements. By varying the sensing frequency, a sensing frequency that is not subject to intermittent interference or as much intermittent interference may be identified.

Continuing with FIG. 4, if a determination is made not to repeat, the flow may proceed to Step 421. In Step 421 interference mitigation is performed based on detecting intermittent interference. For example, the interference mitigation may be to change the sensing frequency of the sensing signals for the absolute capacitive sensing. Other techniques for intermittent interference mitigation may be performed without departing from the scope of the disclosure.

As shown above, by halting the next frame of sensing and obtaining absolute capacitive measurements, the sets of absolute capacitive measurements compared may be temporally close to each other such that the state of the sensing region does not change between absolute capacitive sensing. Thus, intermittent interference may be detected. By detecting intermittent interferences, intermittent interference may be mitigated. By distinguishing intermittent interference from persistent interference and not attempting to correct intermittent interference using techniques for correcting persistent interference, one or more embodiments may be able to better detect the presence of actual input objects in the sensing region, thereby improving the operation of the input device.

Thus, the embodiments and examples set forth herein were presented in order to best explain the present disclosure and the particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

What is claimed is:

1. A processing system for interference management in capacitive touch input detection that uses mutual capacitive sensing and self-capacitive sensing, comprising: sensor circuitry configured to:
   perform, at a first sensing frame, a first mutual capacitive sensing to obtain a first mutual capacitive measurement, and
   perform, at the first sensing frame, a first self-capacitive sensing to obtain a first self-capacitive measurement; and
   processing circuitry coupled to the sensor circuitry and configured to:
   detect whether a first inconsistency exists between the first mutual capacitive measurement and the first self-capacitive measurement;
   halt, in response to detecting the first inconsistency, a second sensing frame subsequent to the first sensing frame, to trigger a second self-capacitive sensing to obtain a second self-capacitive measurement;
   determine, using the first self-capacitive measurement and the second self-capacitive measurement, a type of interference from the first inconsistency;
   perform interference mitigation on the self-capacitive measurements based on the determined type of interference; and
   proceed, in response to not detecting the first inconsistency, to the second sensing frame to trigger the second mutual-capacitive sensing to obtain a second mutual capacitive measurement.

2. The processing system of claim 1, wherein the processing circuitry is further configured to:

determine, in response to not detecting the inconsistency, positional information for any input object in a sensing region using the second sensing frame.

3. The processing system of claim 1, wherein the sensor circuitry is further configured to:
perform third self-capacitive sensing to obtain a third self-capacitive measurement; and
wherein the processing circuitry is connected to the sensor circuitry and configured to:
trigger performing the third self-capacitive sensing in response to detecting interference,
compare the third self-capacitive measurement with the first mutual capacitive measurement, and
detect a second inconsistency between the third self-capacitive measurement and the first mutual capacitive measurement.

4. The processing system of claim 3, wherein the processing circuitry is further configured to:
compare the third self-capacitive measurement with the second self-capacitive measurement,
detect a consistency between the third self-capacitive measurement and the second self-capacitive measurement, and
perform baseline error mitigation based on detecting the second inconsistency and detecting the consistency.

5. The processing system of claim 3, wherein the processing circuitry is further configured to:
compare the third self-capacitive measurement with the second self-capacitive measurement, and
detect a third inconsistency between the third self-capacitive measurement and the second self-capacitive measurement.

6. The processing system of claim 5, wherein the processing circuitry is further configured to:
perform intermittent interference mitigation based on detecting the third inconsistency.

7. The processing system of claim 6, wherein performing the intermittent interference mitigation comprises changing a frequency of a subsequent self-capacitive sensing from a frequency used to perform the first self-capacitive sensing.

8. A method for interference management in capacitive touch input detection that uses mutual capacitive sensing and self-capacitive sensing, comprising:
performing, at a first sensing frame, a first mutual capacitive sensing to obtain a first mutual capacitive measurement;
performing, at the first sensing frame, a first self-capacitive sensing to obtain a first self-capacitive measurement;
detecting whether a first inconsistency exists between the first mutual capacitive measurement and the first self-capacitive measurement;
halting, in response to detecting the first inconsistency, a second sensing frame subsequent to the first sensing frame, to trigger a second self-capacitive sensing to obtain a second self-capacitive measurement;
determining, using the first self-capacitive measurement and the second self-capacitive measurement, a type of interference from the first inconsistency;
performing interference mitigation on the self-capacitive measurements based on the determined type of interference; and
proceeding, in response to not detecting the first inconsistency, to the second sensing frame to trigger the second mutual-capacitive sensing to obtain a second mutual capacitive measurement.

9. The method of claim 8, further comprising:
determining, in response to not detecting the inconsistency, positional information for any input object in a sensing region using the first self-capacitive measurement and the first mutual capacitive measurement.

10. The method of claim 8, further comprising:
triggering performing third self-capacitive sensing in response to detecting interference;
performing the third self-capacitive sensing to obtain a third self-capacitive measurement;
comparing the third self-capacitive measurement with the first mutual capacitive measurement; and
detecting a second inconsistency between the third self-capacitive measurement and the first mutual capacitive measurement.

11. The method of claim 10, further comprising:
comparing the third self-capacitive measurement with the second self-capacitive measurement;
detecting a consistency between the third self-capacitive measurement and the second self-capacitive measurement; and
performing baseline error mitigation based on detecting the second inconsistency and detecting the consistency.

12. The method of claim 10, further comprising:
comparing the third self-capacitive measurement with the second self-capacitive measurement; and
detecting a third inconsistency between the third self-capacitive measurement and the second self-capacitive measurement.

13. The method of claim 12, further comprising:
performing intermittent interference mitigation based on detecting the third inconsistency.

14. The method of claim 13, wherein performing the intermittent interference mitigation comprises changing a frequency of subsequent self-capacitive sensing from a frequency used to perform the first self-capacitive sensing.

15. An input device for interference management in capacitive touch input detection that uses mutual capacitive sensing and self-capacitive sensing, comprising:
a plurality of sensor electrodes configured to acquire a first mutual capacitive measurement and a first self-capacitive measurement of a sensing region; and
a processing system coupled to the plurality of sensor electrodes and configured to:
perform, for a first sensing frame, a first mutual capacitive sensing to obtain the first mutual capacitive measurement,
perform, for the first sensing frame, a first self-capacitive sensing to obtain the first self-capacitive measurement,
detect whether a first inconsistency exists between the first mutual capacitive measurement and the first self-capacitive measurement,
halt, in response to detecting the first inconsistency, a second sensing frame subsequent to the first sensing frame, to trigger a second self-capacitive sensing to obtain a second self-capacitive measurement;
determine, using the first self-capacitive measurement and the second self-capacitive measurement, a type of interference from the first inconsistency;
perform interference mitigation on the self-capacitive measurements based on the determined type of interference; and
proceed, in response to not detecting the first inconsistency, to the second sensing frame to trigger the second mutual-capacitive sensing to obtain a second mutual capacitive measurement.

16. The input device of claim 15, wherein the processing system is further configured to:
- trigger performing third self-capacitive sensing in response to detecting interference,
- perform the third self-capacitive sensing to obtain a third self-capacitive measurement,
- compare the third self-capacitive measurement with the first mutual capacitive measurement, and
- detect a second inconsistency between the third self-capacitive measurement and the mutual capacitive measurement.

17. The input device of claim 16, wherein the processing system is further configured to:
- compare the third self-capacitive measurement with the second self-capacitive measurement, and
- detect a third inconsistency between the third self-capacitive measurement and the second self-capacitive measurement.

* * * * *

UNITED STATES PATENT AND TRADEMARK OFFICE
CERTIFICATE OF CORRECTION

PATENT NO. : 10,613,682 B2  
APPLICATION NO. : 15/664971  
DATED : April 7, 2020  
INVENTOR(S) : Matthew Stevenson Page 1 of 1

It is certified that error appears in the above-identified patent and that said Letters Patent is hereby corrected as shown below:

On the Title Page

Item (57) ABSTRACT, occurring on the sixth line, the word "a" should be removed.

In the Claims

Claim 1, Column 18, Line 63, the word "the", between the words "trigger" and "second", should read -- a --.

Claim 8, Column 19, Line 65, the word "the", following the word "trigger", should read -- a --.

Claim 15, Column 20, Line 65, the word "the", following the word "trigger", should read -- a --.

Signed and Sealed this  
Seventh Day of July, 2020

Andrei Iancu  
*Director of the United States Patent and Trademark Office*